US008655525B2

(12) United States Patent
Samie et al.

(10) Patent No.: US 8,655,525 B2
(45) Date of Patent: Feb. 18, 2014

(54) SELECTABLE ONE-WAY CLUTCH OPERATION IN A HYBRID POWERTRAIN

(75) Inventors: Farzad Samie, Franklin, MI (US);
Larry D. Diemer, Clarkston, MI (US);
Chunhao J. Lee, Troy, MI (US); Scott William Heitzenrater, Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 613 days.

(21) Appl. No.: 12/956,254

(22) Filed: Nov. 30, 2010

(65) Prior Publication Data
US 2012/0136518 A1  May 31, 2012

(51) Int. Cl.
*G05D 1/00*  (2006.01)
*G06F 7/00*  (2006.01)

(52) U.S. Cl.
USPC ................ 701/22; 701/68; 701/58

(58) Field of Classification Search
USPC ............ 701/22, 54, 67; 180/65.21, 65.265, 180/65.275; 475/275, 276, 278, 285, 289, 475/292, 297, 5; 74/329, 331, 745
See application file for complete search history.

(56) References Cited

U.S. PATENT DOCUMENTS

| 5,285,111 | A  | * | 2/1994  | Sherman ........................ 290/4 C |
| 2006/0237276 | A1 | * | 10/2006 | Jegatheeson ..................... 192/46 |
| 2007/0225097 | A1 | * | 9/2007  | Raghavan et al. ................. 475/5 |
| 2007/0275814 | A1 | * | 11/2007 | Bucknor et al. ............. 475/275 |
| 2007/0278061 | A1 | * | 12/2007 | Wittkopp et al. ............ 192/43.1 |
| 2008/0223681 | A1 | * | 9/2008  | Stevenson et al. .............. 192/43 |
| 2008/0280726 | A1 | * | 11/2008 | Holmes et al. ..................... 477/5 |
| 2008/0300093 | A1 |   | 12/2008 | Borgerson |
| 2009/0084653 | A1 | * | 4/2009  | Holmes ........................ 192/41 A |
| 2009/0098970 | A1 | * | 4/2009  | Kimes ............................... 475/5 |
| 2009/0101001 | A1 | * | 4/2009  | Lloyd ............................. 91/532 |
| 2009/0194381 | A1 | * | 8/2009  | Samie et al. .................. 192/43.2 |
| 2010/0018786 | A1 | * | 1/2010  | Samie et al. .................. 180/65.6 |
| 2010/0204002 | A1 | * | 8/2010  | Borgerson ..................... 475/292 |
| 2010/0234159 | A1 | * | 9/2010  | Lee et al. ............................ 475/5 |
| 2012/0203403 | A1 | * | 8/2012  | Lee et al. ......................... 701/22 |

OTHER PUBLICATIONS

U.S. Appl. No. 13/020,852, Lee et al.

* cited by examiner

*Primary Examiner* — Ian Jen

(57) ABSTRACT

A hybrid powertrain includes a plurality of torque generative devices, a transmission input shaft, and a planetary gear set connecting the torque generative devices to the transmission input shaft. A method to control the powertrain includes monitoring a desired configuration of the powertrain and selectively grounding a gear of the planetary gear set with a selectable one way clutch based upon the desired configuration of the powertrain.

18 Claims, 2 Drawing Sheets

SELECTABLE ONE-WAY CLUTCH OPERATION IN A HYBRID POWERTRAIN

TECHNICAL FIELD

This disclosure is related to a system and method for controlling a hybrid powertrain.

BACKGROUND

The statements in this section merely provide background information related to the present disclosure and may not constitute prior art.

A powertrain includes a torque generative device providing torque to spin a shaft. A hybrid powertrain utilizes at least two torque generative devices. Hybrid powertrains frequently include a number of methods to utilize the torque generative devices, for example, including a method to select a torque generative device to drive a transmission input shaft, to change the torque generative device driving the shaft, to select a plurality of torque generative devices to simultaneously drive the shaft, to utilize one torque generative device to drive another torque generative device, to ground a torque generative device, and to allow the shaft to spin freely or freewheel.

Planetary gear sets are mechanisms known in the art to include three gears or groups of gears. According to one exemplary configuration a sun gear is located at the center of the planetary gear set, a ring gear is located concentrically with the sun gear, and three planet gears rotate between the sun gear and the ring gear, with teeth of each of the planet gears being in constant contact with teeth of the sun gear and the ring gear. Three planetary gears are an exemplary number of planet gears. The three planet gears can be connected by a planet gear carrier which allows all of the planet gears to spin individually, but as the planet gears are driven around the axis of the planetary gear set, they drive the planet gear carrier, thereby supplying a torque to a shaft connected to the planet gear carrier. The same is true in reverse, that a torque can be applied to a planet gear carrier, thereby driving one or both of the other gears of the planetary gear set. Torque applied to one gear or set of gears is transferred to the remaining gears. Torque may be applied to two gears or set of gears to drive the third gear or set of gears.

A planetary gear set can be configured to selectively receive and transmit torque through the various gears and gear sets. Clutch devices known in the art can selectively connect and disconnect various shafts within the powertrain. As a result, an internal combustion engine in one clutch configuration can be providing torque to the planetary gear set through a ring gear, and after a clutch transition, the same engine can be providing torque to the planetary gear set through planet gears of the planetary gear set.

Clutches can be utilized to ground a ring gear or a sun gear in a planetary gear set. For example, in an exemplary configuration an electric motor can provide a torque to a planetary gear set through the sun gear, and a transmission input shaft can be connected to the planet gears. If the ring gear is allowed to rotate freely or freewheel, requiring negligible torque rotate the ring gear, then the planet gears are likely to rotate in place without substantially providing torque to the transmission input shaft through the planet gear carrier. If the same configuration instead includes a clutch grounding the ring gear, preventing the ring gear from turning, then the torque provided through the sun gear will drive the planet gears around the sun gear and provide torque to the transmission input shaft.

Freewheeling can be desirable based upon the direction of torque transmission through the planetary gear set. For example, given the embodiment described above with an electric motor driving the sun gear, with the embodiment operating within a vehicle, the motor can provide propelling force to the transmission input shaft as the vehicle is driving down the street. However, as the vehicle begins to traverse a downhill slope, the net balance of forces upon the vehicle including the force of gravity pulling the vehicle down the hill can reverse the direction of torque acting upon the planetary gear set, with the transmission input shaft acting to speed up the electric motor. Such a torque upon the motor can be undesirable, and upon detecting such a torque, the clutch grounding the ring gear can be released, such that the torque applied by the transmission input shaft can be dissipated in the freewheeling ring gear rather than being applied to the electric motor.

A powertrain utilizing a rotational input torque through an input shaft to drive a transmission input shaft is known to utilize a transmission to change gear states describing a relationship of the input to the output. Operation of the above devices within a powertrain requires management of numerous torque bearing shafts or devices representing connections to the above mentioned engine, electrical machines, and transmission input shaft or driveline. Planetary gear sets and clutch devices are also known to be utilized within a transmission, providing a number of gear states that the transmission can be operated within based upon the configuration of the engaged and disengaged clutches and the transmission of torque through the various gears and gear sets within the planetary gear sets. One exemplary transmission includes four planetary gear sets resulting in eight forward gear states and a reverse gear state and utilizes five clutches to select between the various gear states. As described above in relation to the planetary gear set selecting between the various hybrid methods, the gears among the transmission planetary gear sets can include gears that are grounded or gears that are set to freewheel, depending upon the desired operation of the transmission or the desired gear state.

Clutches can be operated according to a number of embodiments known in the art. According to one known method, hydraulic pressure can be utilized to actuate a clutch. In an exemplary clutch utilizing hydraulic pressure in combination with pistons selectively applying force based upon the hydraulic pressure, an exemplary shift between states controlled by a pair of clutches requires that one clutch be unloaded, permitting two shafts that were previously coupled to spin freely of each other, and subsequently that another clutch be loaded, coupling two shafts that were formerly decoupled or free to spin relative to one another. Such hydraulically actuated clutch devices frequently include clutch plates that are spring loaded to a default decoupled position, and hydraulic pressure applied to an associated piston applies pressure that overcomes the bias of the spring to bring the plates to a coupled position.

SUMMARY

A hybrid powertrain includes a plurality of torque generative devices, a transmission input shaft, and a planetary gear set connecting the torque generative devices to the transmission input shaft. A method to control the powertrain includes monitoring a desired configuration of the powertrain and selectively grounding a gear of the planetary gear set with a selectable one way clutch based upon the desired configuration of the powertrain.

BRIEF DESCRIPTION OF THE DRAWINGS

One or more embodiments will now be described, by way of example, with reference to the accompanying drawings, in which.

DETAILED DESCRIPTION

Figure 1:
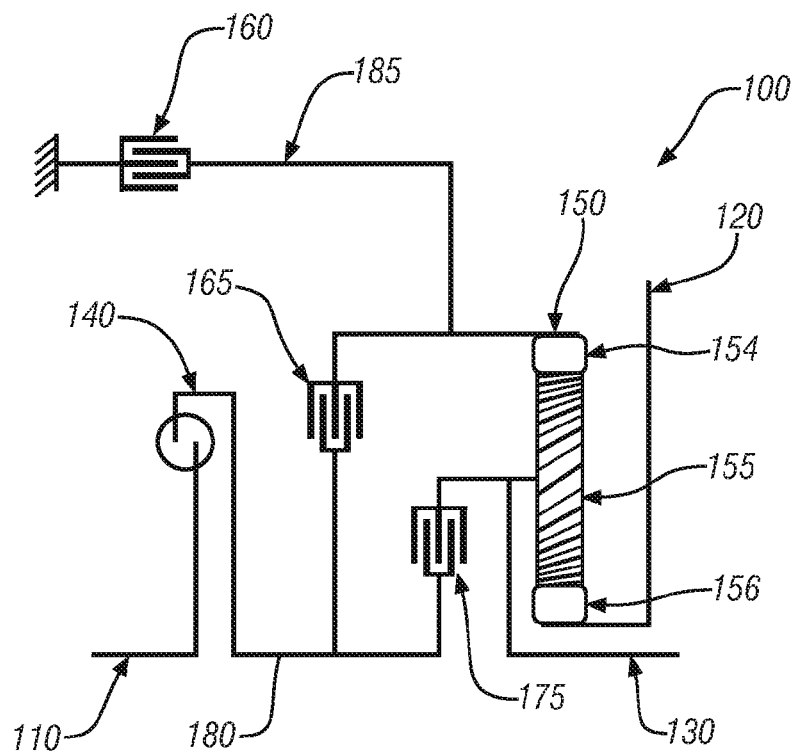
FIG. 1 schematically illustrates an exemplary hybrid powertrain including a planetary gear set and associated selectably operable clutches, in accordance with the present disclosure.

Referring now to the drawings, wherein the showings are for the purpose of illustrating certain exemplary embodiments only and not for the purpose of limiting the same, FIG. 1 schematically illustrates an exemplary hybrid powertrain including a planetary gear set and associated selectably operable clutches selectively connecting a plurality of torque generative devices to a transmission input shaft, in accordance with the present disclosure. Hybrid powertrain 100 is depicted, including input shaft 110 supplying an engine torque, $T_E$; motor shaft 120 supplying a motor torque, $T_M$; transmission input shaft 130, including a transmission input torque, $T_I$; and a planetary gear set 150. Torque converter 140 is additionally depicted. Torque transmitting shafts 180 and 185 are additionally depicted. Planetary gear set 150 includes exemplary gears 154 and 156 and planet gears 155. Gears 154 and 156 include a sun gear and a ring gear. In the non-limiting exemplary depiction of FIG. 1, gear 154 is a ring gear and gear 156 is a sun gear. Three clutches are depicted including clutch A 160, clutch B 165, and clutch C 175. As depicted, clutch A 160, clutch B 165, and clutch C 175 include clutches that are actuated either to a coupled position, locking the associated shafts, or to a decoupled position, permitting the associated shafts to spin freely of each other. Exemplary embodiments of clutch A 160, clutch B 165, and clutch C 175 include hydraulically actuated clutches, described above.

Control methods of hydraulic clutches in a powertrain are known in the art. Pressure to the clutch is controlled in order to actuate the clutch from a locked to an unlocked position. In some embodiments, a middle or slip position can be controlled in the clutch. A number of methods to control the pressure to the hydraulic clutch are known and will not be described in detail herein.

Operation of clutches can be expressed through a shift table describing the states of the various clutches depending upon desired operation of the powertrain. Table 1 describes exemplary operation of clutches A, B, and C, as depicted in FIG. 1.

TABLE 1

| Maneuver | A | B | C |
|---|---|---|---|
| Idle engine off | x | | |
| Electric mode launch (Transmission fwd gear) | x | | |
| Electric mode launch (Trans. rev gear) | x | | |
| Electric mode drive (Trans. fwd gear) | x | | |
| Electric mode drive (Trans. rev gear) | x | | |
| Electric mode - motor in reverse (Trans. fwd gear) | x | | |
| Electric mode - motor in regeneration (Trans. fwd gear) | x | | |
| Electric mode, transition to engine on | x | | slip |
| Parallel hybrid | | x | x |
| Engine on mode, transition to electric mode | x | | slip |

The designation x describes a locked clutch. The designation slip describes a clutch operated in a less than locked condition, transmitting torque across the clutch but with relative movement within clutch. In this way, clutch A, B, and C can be controlled to selectively transfer torque in a powertrain.

Another exemplary type of known clutch includes a selectable one-way clutch (SOWC). Such an SOWC permits rotation in a freewheeling direction and is rotationally fixed or will not allow rotation in a locked direction. An exemplary one way clutch includes two concentric rings located such that one fits within the other. Upon the surface whereat the two concentric rings interact, a mechanism is utilized to allow a rotation of the rings in one direction and stop rotation between the rings in the other direction or enabling one way operation of the clutch. A number of mechanisms enabling the one way function of the SOWC are known. An exemplary mechanism includes spring loaded tabs that are hinged and oriented around the circumference one of the rings, such that when extended, one of the tabs extends to within the circumference of the other ring and when depressed, the tab fits within the circumference of the ring to which it is hinged. The other ring to which the tabs are not hinged include indented features shaped to either accept the mating tab and rotationally fix the rings together in the locked direction or depress the mating tab into the depressed position permitting rotation in the freewheeling direction. A number of SOWC designs are known, including sprag-type, strut-type, roller-type, diode-type, or pawl-type and the disclosure is not intended to be limited to the particular exemplary embodiments described herein.

In addition to the described one way function of the SOWC, such clutches include a selectable function, wherein function of the one way device can be modified. Such selectable function can include a number of embodiments. In one exemplary selectable function of an SOWC, the SOWC can be selected to operation in two states, including a first state locked in a forward direction and freewheeling in a reverse direction and a second state freewheeling in the forward direction and locked in the reverse direction. A number of mechanisms can be used to provide the selectable function of an SOWC. In one exemplary embodiment, an annular ring located around the circular members of the SOWC can include a plurality of tabs to interact with the locking mechanisms of the SOWC, with mechanical translation of the annular ring determining the selectable function of the SOWC by the tabs restraining operation of the locking mechanisms. Actuation of the SOWC selectable function can be accomplished by hydraulic activation, electronic activation, or any other method known in the art, for example, by command from a control module.

Utilizing an SOWC in a powertrain includes use in a location wherein selection between clutch settings can take place when the clutch is unloaded. Many locking mechanisms cannot be transitioned from a locked to an unlocked state while the clutch is loaded.

Freewheeling and grounding of a planetary gear set is frequently a static parameter for a particular gear state setting. For example, with a particular configuration selected, a clutch controlling a gear of the planetary gear set will be selectively activated to a ground setting to transmit power from the torque generative device to the driveline and selectively deactivated to allow the powertrain to coast. In such an example, a hydraulic clutch can be activated when a monitored torque balance is in a positive direction through the planetary gear set, such a positive direction describing the engine providing torque to the driveline, and the hydraulic clutch can be deactivated to a freewheel setting when the torque balance is in a negative direction, such a negative direction describing the torque being provide by the driveline through the transmission being greater than the engine torque. Operating a hydraulic clutch in such circumstances requires monitoring or modeling the torque balance through the planetary gear set and controlling the hydraulic clutch based upon the desired ground or freewheel setting. It will be appreciated that a clutch with one way function can be useful in such operation. In such a configuration, the one way operation of the clutch can automatically freewheel in one direction and ground in the other, thereby eliminating the need to activate a hydraulic clutch for every transition in torque balance direction. Additionally, an open hydraulic clutch includes a substantial drag value, describing power lost to friction within the open clutch. In one exemplary configuration, an open clutch includes a drag of 1.2 N-m. Such a drag value reduces efficiency of the powertrain. A freewheeling SOWC includes a typically lower drag value. In one exemplary configuration, a freewheeling SOWC includes a drag of 0.2 N-m. While operation of a one way clutch can fit a selected configuration of the powertrain, operation of the powertrain and corresponding requirements of the clutch setting can vary. For example, if an electric motor is connected to the planetary gear set and is desired to be operated in regeneration mode, with torque being transmitted from the driveline to the motor being used to generate electricity for storage and later use, the planetary gear set will require that the clutch remain grounded despite the driveline torque exceeding the motor torque. An SOWC can include a selectable function, allowing either freewheeling or selection of a grounded setting in the event that the driveline torque exceeds the motor torque.

Other examples exist wherein the state of the clutch requires selection, for example, in the exemplary configuration of FIG. 1, clutches 165 and 175 can be selectably activated, for example, with only clutch 175 being activated at lower gears, in combination with clutch 160 being set to a grounded setting, provides a potential gear reduction in relation to the spinning of member 130 or varying interaction between the motor and the torque transmitted through the planetary gear set. The same configuration in higher gears, in combination with clutch 160 being set to a freewheeling state and activating both clutches 165 and 175, provides a fixed relationship between the engine and the rotation of member 130. In these examples and other exemplary configurations known in the art, selection of a grounded setting or a freewheeling setting of a clutch connected to a planetary gear set of a powertrain is required to operate and control the powertrain throughout a full range of operational settings.

A method to control a powertrain that includes a plurality of torque generative devices includes utilizing an SOWC to selectively provide grounding or freewheeling for a planetary gear set located between a torque generating device of the powertrain and a transmission of the powertrain.

Figure 2:
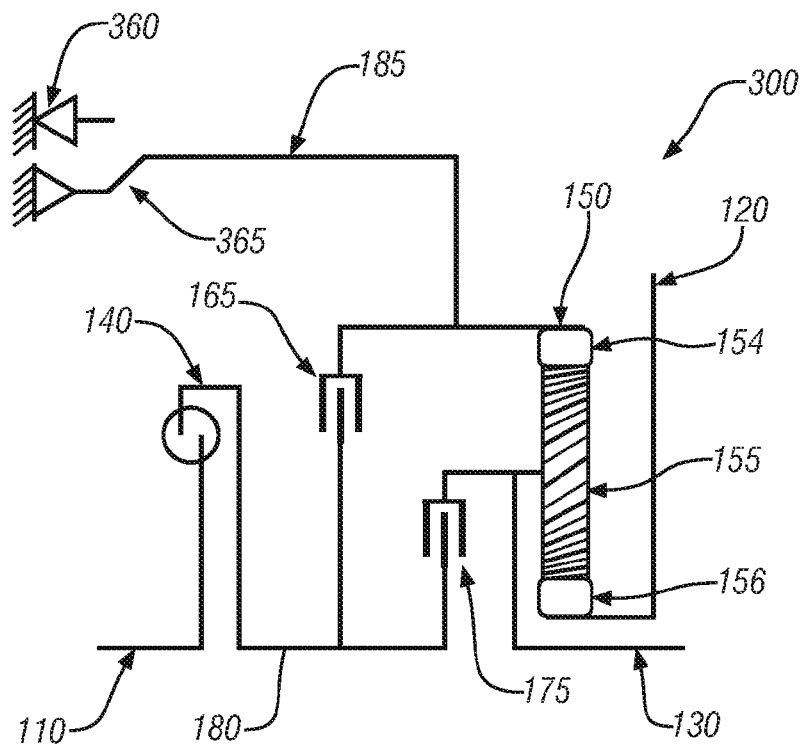
FIG. 2 schematically illustrates an exemplary hybrid powertrain including a planetary gear set and associated selectably operable clutches selectively connecting a plurality of torque generative devices to a transmission input shaft, including an SOWC, in accordance with the present disclosure.

FIG. 2 schematically illustrates an exemplary hybrid powertrain including a planetary gear set and associated selectably operable clutches selectively connecting a plurality of torque generative devices to a transmission input shaft, including an SOWC, in accordance with the present disclosure. Hybrid powertrain 300 is depicted, including input shaft 110 supplying an engine torque, $T_E$; motor shaft 120 supplying a motor torque, $T_M$; transmission input shaft 130, including a transmission input torque, $T_I$; and a planetary gear set 150. Torque converter 140 is additionally depicted. Torque transmitting shafts 180 and 185 are additionally depicted. Planetary gear set 150 includes exemplary gear 154 as a ring gear, planet gears 155, and gear 156 as a sun gear. Three clutches are depicted including SOWC 360, clutch B 165, and clutch C 175. As depicted, clutch B 165, and clutch C 175 include clutches that are actuated either to a coupled position, locking the associated shafts, or to a decoupled position, permitting the associated shafts to spin freely of each other. Exemplary embodiments of clutch B 165 and clutch C 175 include hydraulically actuated clutches, described above. SOWC 360 includes selection mechanism 365 for selecting between the clutch locking in a forward direction and the clutch locking in a rearward direction. Depending upon the selected setting of SOWC 360, gear 154 is locked in one direction, grounding planetary gear set 150, and allowed to spin in the opposite direction, permitting planetary gear set 150 to freewheel in that direction.

Selection between locking in the forward direction and locking in the rearward direction is a depicted selection function for SOWC 360. It will be appreciated that different particular SOWCs can have different selection functions, for example, selecting between being locked in one direction and being locked in both directions or selecting between three settings, such as locked in one direction, locked in the other direction, and locked in both directions. A number of SOWC configurations are envisioned, and the disclosure is not intended to be limited to the particular exemplary embodiments described herein.

Desired operation of an SOWC within a powertrain may depend upon the desired operation or maneuver being performed by the powertrain. Table 2 describes a number of powertrain maneuvers and corresponding exemplary clutch states for the exemplary powertrain 300 of FIG. 2.

TABLE 2

| Maneuver | SOWC | B | C |
|---|---|---|---|
| Idle engine off | F-R | | |
| Electric mode launch (Transmission fwd gear) | F | | |
| Electric mode launch (Trans. rev gear) | F | | |
| Electric mode drive (Trans. fwd gear) | F | | |
| Electric mode drive (Trans. rev gear) | F | | |
| Electric mode - motor in reverse (Trans. fwd gear) | R | | |
| Electric mode - motor in regeneration (Trans. fwd gear) | R | | |
| Electric mode, transition to engine on | F | | slip |
| Parallel hybrid | F | x | x |
| Engine on mode, transition to electric mode | F | | slip |

The value x describes a locked hydraulically actuated clutch. The value F describes an SOWC locked in forward direction and freewheeling in a rearward direction. R describes an SOWC locked in a rearward direction, and F-R describes an SOWC locked in both a rearward and forward direction. A space describes an unlocked clutch or a clutch freewheeling in both directions. An exemplary SOWC clutch capable of four modes can be utilized to achieve all four mentioned states: freewheeling in both directions, locked in either direction, or locked in both directions. However, in some embodiments, a requirement to lock the SOWC in one direction does not preclude maintaining the SOWC locked in the other direction. An exemplary two mode SOWC selects between two modes or states. In an exemplary vehicular application, under normal operation driving in a forward direction, the SOWC can be locked in a forward direction, providing motive force to the vehicle. When an SOWC locked in a reverse direction is required, for example, to provide engine braking, regenerative braking, or motive force in a reverse direction, for example, as provided by a motor operating in reverse, the SOWC may be able to remain locked in the forward direction despite being locked in the reverse direction. In this way, complexity of the SOWC can be reduced by requiring only two selectable modes instead of more than two. An exemplary three mode SOWC can be utilized selecting between three states, for example, including a forward locked mode, a rearward locked mode, and a freewheeling mode. Depending upon the particular embodiment of the powertrain, a two mode SOWC can be configured to utilize any two of the possible modes and a three way SOWC can be configured to utilize any three of the possible modes.

The maneuvers described include an idle engine off operation, wherein an electric motor is engaged to the planetary gear set. The maneuvers described also include an electric mode in forward gear during launch operation, wherein an electric motor is used solely initiate forward movement of the powertrain from a standstill. The maneuvers described also include an electric mode in reverse gear during launch operation, wherein an electric motor is used solely initiate rearward movement of the powertrain from a standstill. The maneuvers described also include an electric mode in forward gear during drive operation, wherein an electric motor is used solely sustain forward movement of the powertrain from a standstill. The maneuvers described also include an electric mode in reverse gear during drive operation, wherein an electric motor is used solely sustain rearward movement of the powertrain from a standstill. The maneuvers described also include a transition from electric mode to engine on operation and an additional transition from engine on mode to electric mode operation. The maneuvers described also include a parallel hybrid configuration, wherein both torque from the engine and torque from the electric motor are utilized to provide torque to the drivetrain through the planetary gear set. Table 2 describes a number of maneuvers or desired powertrain operational states that utilize the SOWC locked in a forward direction and a single desired powertrain operational state that requires the SOWC to be freewheeling in the forward direction. A number of additional or alternative maneuvers or desired powertrain operational states are envisioned, and the disclosure is not intended to be limited to the particular exemplary embodiments described herein. In another exemplary mode, a regeneration mode, the SOWC can be used to lock in a rearward direction with reverse struts in order to provide torque from the driveline to the electric motor.

A planetary gear set in combination with an SOWC can be utilized to selectively connect a plurality of torque generative devices to an input shaft to a transmission. Similarly, an SOWC can be utilized within a transmission. Co-pending and commonly assigned U.S. Ser. No. 12/117,923 (corresponding U.S. Patent Publication No. 2008/0300093 A1) describes operation of an SOWC within a transmission and is incorporated herein by reference.

Figure 3:
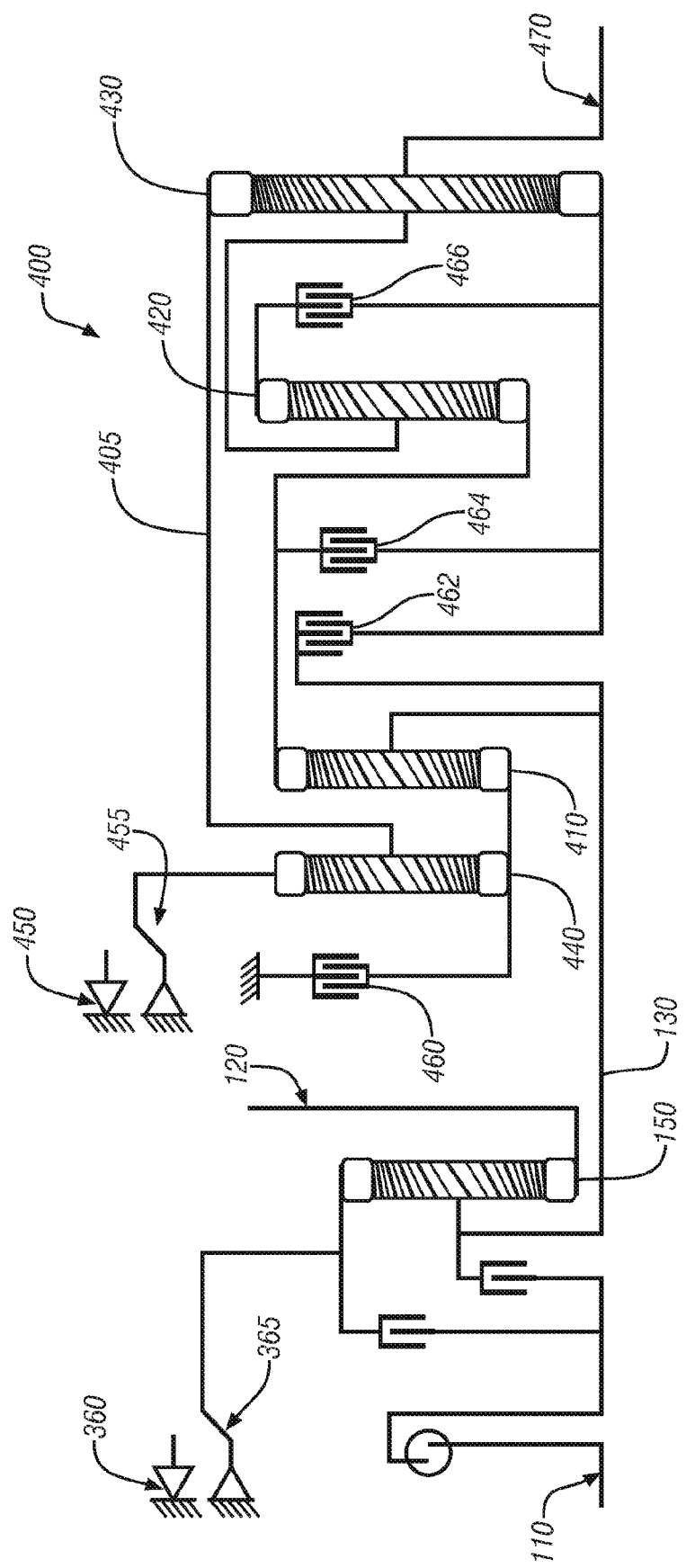
FIG. 3 schematically illustrates an exemplary hybrid powertrain including a planetary gear set and associated clutches, including a selectable one-way clutch located to permit transmission of tractive torque in a selectable locked direction and decoupled rotation of a transmission input shaft in a selectable freewheeling direction, in accordance with the present disclosure.

FIG. 3 schematically illustrates an exemplary hybrid powertrain including a planetary gear set and associated selectably operable clutches selectively connecting a plurality of torque generative devices to a transmission input shaft, including an SOWC, and an exemplary eight speed transmission utilizing a second SOWC, in accordance with the present disclosure. Hybrid powertrain 400 is depicted, including input shaft 110 supplying an engine torque, $T_E$; motor shaft 120 supplying a motor torque, $T_M$; transmission input shaft 130, including a transmission input torque, $T_I$; and a planetary gear set 150. SOWC 360 is depicted including selection mechanism 365. Transmission 405 is additionally depicted, including planetary gear sets 410, 420, 430, and 440. Second SOWC 450 is depicted, including selection mechanism 455. As described above, an SOWC must be placed whereat torque is at zero or can be brought to zero across the SOWC in order to enable the SOWC to transition from a locked to an unlocked state. Transmission 405 operates by selective activation of hydraulically activated clutches 460, 462, 464, and 466. Second SOWC 450 functions to ground the ring gear of planetary gear set 440. Clutch 460 functions to ground the sun gears of planetary gear sets 410 and 440. Clutch 462 functions to connect the planet gear of planetary gear set 410 to the sun gear of planetary gear set 430. Clutch 464 functions to connect the ring gear of planetary gear set 410 to the sun gear of planetary gear set 430. Clutch 466 functions to connect the ring gear of planetary gear set 420 to the sun gear of planetary gear set 430. Second SOWC 450 is selectively controlled based upon a desired gear state of transmission 405. According to operation of clutches including operation of SOWC 450 based upon the desired gear state, transmission 405 transmits torque between shaft 130 and a driveline shaft 470, with a gear factor defined by the desired or current gear state.

Table 3 provides exemplary operation of hybrid powertrain 400, in accordance with the present disclosure.

TABLE 3

| Gear State | SOWC 450 | Clutch 460 | Clutch 462 | Clutch 464 | Clutch 466 |
| --- | --- | --- | --- | --- | --- |
| Reverse | F-R | x | | | x |
| Neutral | o | o | | | |
| $1^{st}$ | F-R | x | x | | |
| $2^{nd}$ | F-R | x | | x | |
| $3^{rd}$ | F-R | | x | x | |
| $4^{th}$ | F-R | | | x | x |
| $5^{th}$ | F-R | | x | | x |
| $6^{th}$ | F | | | x | x | x |
| $7^{th}$ | F | x | x | | x |
| $8^{th}$ | F | x | | x | x |

As described above, second SOWC 250 selectively grounds a connected member of a planetary gear set. In an R or reverse direction setting in reverse gear, second SOWC 450 provides a selective application of torque such that a torque can be applied to the drivetrain in a reverse direction, when torque is applied to the transmission input in the forward direction. In another embodiment, the reverse gear could include an identical gear setting to the first gear, with the torque applied to the transmission input in a reverse direction. In neutral, in the exemplary embodiment described in Table 3, no torque is applied to the transmission input, and the O signifies that any SOWC setting can be utilized. In forward gears one through five, the depicted transmission configuration is enabled to transmit torque in either a forward or a reverse direction, with the engagement of engine braking or regenerative braking, for example, selectably engaged by the operation of the first SOWC 360. According to the F-R designation, in gears one through five, second SOWC 450 is locked in both directions. In gears six through eight, engine braking and regenerative braking are no longer enabled, and the SOWC remains locked in the forward direction only, allowing transmission of torque to drive the drivetrain, but also allowing freewheeling in the reverse direction to enable coasting.

The above methods can be operated within a control module. A control module can be embodied within a unitary device, performing the methods described herein. In other embodiments, the control module is located within or as a part of a larger control module, for example, within a transmission control module. In other embodiments, the control module can describe functions performed within a plurality of physical devices and operated to operate the methods as described.

Control module, module, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method to control a powertrain comprising a plurality of torque generative devices, a transmission input shaft, and a planetary gear set connecting the torque generative devices to a first end of the transmission input shaft, the method comprising:
monitoring a desired configuration of the powertrain, wherein the transmission input shaft comprises the first end coupled to the planetary gear set and a second end coupled to a transmission;
selectively grounding a ring gear of the planetary gear set with a selectable one way clutch based upon a desired setting of the selectable one way clutch, wherein the planetary gear set comprises the ring gear, a sun gear engaged to one of the plurality of torque generative devices and a plurality of planet gears engaged to the first end of the transmission input shaft;
determining the desired setting of the selectable one way clutch based upon the desired configuration of the powertrain, wherein determining the desired setting comprises selecting between:
the selectable one way clutch freewheeling in a first direction and a second direction, wherein the ring gear is permitted to rotate in both the first and second directions,
the selectable one way clutch being locked in the first direction and freewheeling in the second direction, wherein the ring gear is grounded in the first direction and permitted to rotate in the second direction,
the selectable one way clutch being locked in the second direction and freewheeling in the first direction, wherein the ring gear is grounded in the second direction and permitted to rotate in the first direction, and
the selectable one way clutch being locked in the first direction and the second direction, wherein the ring gear is grounded in both the first direction and the second direction.

2. The method of claim 1, wherein monitoring the desired configuration of the powertrain comprises monitoring a desired gear state of the powertrain.

3. The method of claim 2, wherein the desired configuration of the powertrain further comprises a direction of operation of an electric motor.

4. The method of claim 2, wherein the desired configuration of the powertrain further comprises engine braking.

5. The method of claim 2, wherein the desired configuration of the powertrain further comprises regenerative braking.

6. The method of claim 1, wherein monitoring the desired configuration of the powertrain comprises monitoring desired operation of the plurality of torque generative devices.

7. The method of claim 1, further comprising:
monitoring a desired gear state; and
selectively grounding a gear of a second planetary gear set within a transmission device with a second selectable one way clutch.

8. System to control a powertrain comprising a plurality of torque generative devices, a planetary gear set, and a transmission input shaft, the system comprising:
the planetary gear set transmitting torque between the torque generative devices and the transmission input shaft, wherein the transmission input shaft comprises a first end coupled to the planetary gear set and a second end coupled to a transmission;
a selectable one way clutch selectively grounding a ring gear of the planetary gear set based upon a desired setting of the selectable one way clutch, wherein the planetary gear set comprises the ring gear, a sun gear engaged to one of the plurality of torque generative devices and a plurality of planet gears engaged to a first end of the transmission input shaft; and
a control module:
monitoring desired operation of the powertrain;
determining a desired setting of the selectable one way clutch based upon the desired operation of the powertrain, wherein determining the desired setting comprises selecting between:
the selectable one way clutch freewheeling in a first direction and a second direction, wherein the ring gear is permitted to rotate in both the first and second directions,
the selectable one way clutch being locked in the first direction and freewheeling in the second direction, wherein the ring gear is grounded in the first direction and permitted to rotate in the second direction, the selectable one way clutch being locked in the second direction and freewheeling in the first direction, wherein the ring gear is grounded in the second direction and permitted to rotate in the first direction, and the selectable one way clutch being locked in the first direction and the second direction, wherein the ring gear is grounded in both the first direction and the second direction; and controlling the selectable one way clutch based upon the desired setting of the selectable one way clutch.

9. The system of claim 8, wherein the selectable one way clutch comprises a clutch selected from the group consisting of a sprag-type clutch, a strut-type clutch, a roller-type clutch, a diode-type clutch, and pawl-type clutch.

10. The system of claim 8, wherein controlling the selectable one way clutch comprises controlling actuation selected from the group consisting of hydraulic actuation of the clutch and electronic actuation of the clutch.

11. The system of claim 8, wherein the plurality of torque generative devices comprise:

an internal combustion engine; and an electric motor.

12. The system of claim 8, wherein the transmission comprises a second selectable one way clutch; and the control module further:

monitoring a desired gear state;

determining a desired setting for the second selectable one way clutch; and controlling the second selectable one way clutch based upon the desired setting for the second selectable one way clutch.

13. The system of claim 12, wherein the plurality of torque generative devices comprises an electric motor;

wherein the control module further monitors a direction of operation of electric motor; and wherein controlling the second selectable one way clutch is further based upon the direction of operation of the electric motor.

14. The system of claim 12, wherein the control module further monitors an operation of a regeneration mode; and wherein controlling the second selectable one way clutch is further based upon the operation of the regeneration mode.

15. The system of claim 12, wherein the control module further monitors an operation of an engine braking mode; and wherein the controlling the second selectable one way clutch is further based upon the direction of operation of the engine braking mode.

16. The system of claim 12, wherein the transmission comprises an eight forward gear transmission comprising four planetary gear sets.

17. The system of claim 8, wherein the selectable one way clutch comprises a two mode selectable one way clutch.

18. The system of claim 8, wherein the selectable one way clutch comprises a three mode selectable one way clutch.

* * * * *